United States Patent

Kimura

[11] 4,114,992
[45] Sep. 19, 1978

[54] VARIANT ERNOSTAR TYPE LONG FOCUS LENS SYSTEM

[75] Inventor: Tadashi Kimura, Tokyo, Japan

[73] Assignee: Olympus Optical Co., Ltd., Tokyo, Japan

[21] Appl. No.: 754,635

[22] Filed: Dec. 27, 1976

[30] Foreign Application Priority Data

Dec. 29, 1975 [JP] Japan .................... 51-157983

[51] Int. Cl.² ............................................. G02B 11/30
[52] U.S. Cl. .................................................. 350/216
[58] Field of Search ......................................... 350/216

[56] References Cited

U.S. PATENT DOCUMENTS 3,749,478  7/1973  Nakagawa .................. 350/216

Primary Examiner—Conrad J. Clark
Attorney, Agent, or Firm—Cushman, Darby & Cushman

[57] ABSTRACT

A variant Ernostar type long focus lens system having a very short overall length comprising a first positive miniscus lens, a second positive meniscus lens and a third positive meniscus lens which are arranged very close to one another, a fourth negative meniscus lens and a fifth positive meniscus lens, and said lens system having a focal length of 180–200 mm and a telephoto ratio of approximately 0.93.

4 Claims, 13 Drawing Figures

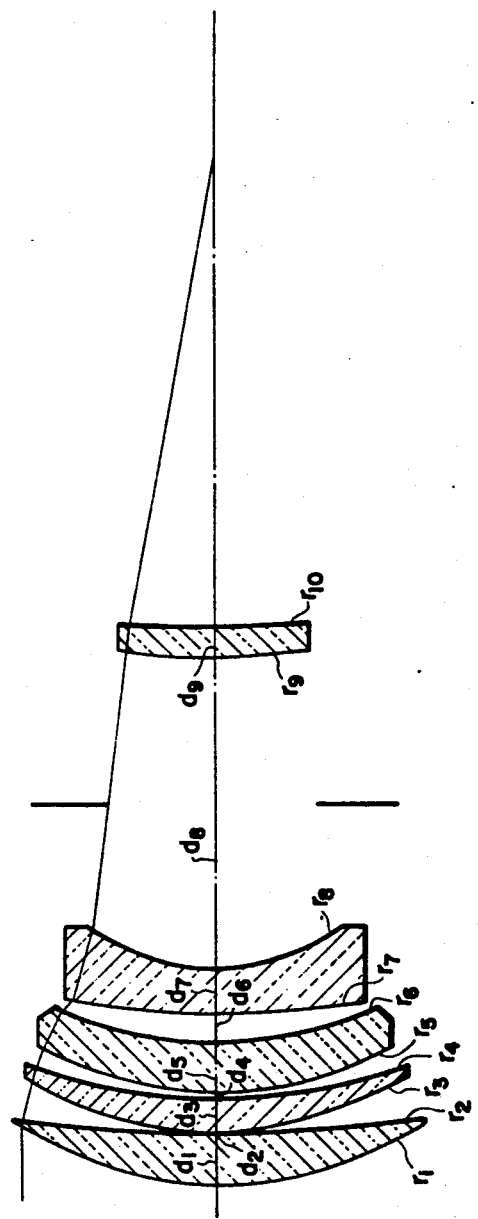

SPHERICAL ABERRATION

ASTIGMATISM

DISTORTION

SPHERICAL ABERRATION

ASTIGMATISM

DISTORTION

FIG. 4A
SPHERICAL ABERRATION
F2.8
d, c, g, F
−0.002  0.002

FIG. 4B
ASTIGMATISM
6.9°
ΔS, ΔM
−0.002  0.002

FIG. 4C
DISTORTION
6.9°
−1.0  1.0

FIG. 5A
SPHERICAL ABERRATION
F2.8
d, c, g, F
−0.002  0.002

FIG. 5B
ASTIGMATISM
6.9°
ΔS, ΔM
−0.002  0.002

FIG. 5C
DISTORTION
6.9°
−1.0  1.0

VARIANT ERNOSTAR TYPE LONG FOCUS LENS SYSTEM

BACKGROUND OF THE INVENTION (a) Field of the Invention

The present invention relates to a variant Ernostar type long focus lens system.

(b) Description of the Prior Art

As Ernostar type long focus lens systems, there have conventionally been known ones comprising four components of five elements, i.e., a first positive lens, a second cemented meniscus doublet lens, a third negative meniscus lens and a fourth positive lens. Such a type of lens systems have common drawbacks that aberrations are unavoidably aggravated by shortening overall lengths of the lens systems and that it is impossible to design the lens systems so as to have large aperture ratios.

In order to eliminate such drawbacks, there have also been designed variant Ernostar type long focus lens systems wherein the second lens component is separated into two meniscus lens elements. It is possible to design a long focus lens system having a large aperture ratio of F/2.8 and short in its overall length by separating the second lens component as is described above. However, this type of lens system has a focal length of 100 to 135 mm. Lens systems having a focal length of 180 mm to 200 mm heretofore known to the public are designed for a telephoto ratio of 1 to 1.2 and a rather long overall lengths.

SUMMARY OF THE INVENTION

It is therefore a general object of the present invention to provide a variant Ernostar type long focus lens system having a focal length of 180 to 200 mm, a telephoto ratio of approximately 0.93 and a very short overall length.

The lens system according to the present invention comprises, as shown in FIG. 1, a first positive meniscus lens component, a second positive meniscus lens component and a third positive lens component which have a convex surface on the object side and are arranged close to one another, a negative meniscus lens component having a convex surface on the object side, a relatively wide airspace and a fifth positive meniscus lens component having a convex surface on the object side. The lens system according to the present invention is so designed as to satisfy the conditions defined below:

(1) $1.3 f < r_2$
(2) $0.3 f < r_3 < 0.36 f$
(3) $0.45 f < r_4 < 0.58 f$
(4) $0.3 f < r_5 < 0.36 f$
(5) $0.38 f < r_6 < 0.46 f$
(6) $0.8 f < r_7 < f$
(7) $0.18 f < r_8 < 0.2 f$
(8) $0.5 f < r_9$
(9) $f < r_{10}$
(10) $0.15 f < d_1 + d_2 + d_3 + d_4 + d_5 + d_6 < 0.17 f$
(11) $0.05 f < d_5 < 0.07 f$
(12) $0.01 f < d_6 < 0.03 f$
(13) $0.03 f < d_7 < 0.05 f$
(14) $0.28 f < d_8$
(15) $1.62 < (n_1 + n_2 + n_3)/3$
(16) $1.76 < n_4$ wherein the reference symbols represent as follows:

$f$: overall focal length of the lens system as a whole
$r_1$ through $r_{10}$: radii of curvature on the surfaces
$d_1$ through $d_9$: thicknesses of the respective lens components and airspaces therebetween
$n_1$ through $n_5$: refractive indices of the first through fifth lens components.

Now, the significance of the aforementioned conditions will be described below:

When radius of curvature $r_2$ is smaller than $1.3f$ in the condition (1), offaxial spherical aberration and high-order chromatic aberration will be aggravated and overall length of the entire lens system will be prolonged. When radius of curvature $r_2$ is selected so as to satisfy the condition (1), astigmatism is produced by the lens surface $r_2$ (image side surface of the first lens component) but can be correced by the lens surfaces of $r_4$ and $r_6$ if radii of curvature $r_4$ and $r_6$ are so selected as to satisfy the conditions (3) and (5) respectively. That is to say, astigmatism cannot be corrected if the radii of curvaute $r_4$ and $r_6$ exceed the upper limits of the conditions (3) and (5). If radii of curvature $r_4$ and $r_6$ are smaller than the lower limits of the conditions (3) and (5), on the other hand, offaxial spherical aberration will be aggravated. When radii of curvature $r_3$ and $r_5$ exceed the upper limits of the conditions (2) and (4), coma and distortion will be aggravated. If radii of curvature $r_3$ and $r_5$ are smaller than the lower limits of the conditions (2) and (4), in contrast, offaxial spherical aberration and high-order chromatic aberration will be aggravated. The conditions (6) and (7) are required for correcting distortion and curvature of field by reducing radii of curvature on the front and especially rear surfaces of the fourth lens component and, further, for shortening the overall length of the lens system as a whole. If radii of curvature $r_7$ and $r_8$ are reduced below the lower limits of these conditions, however, high-order spherical aberration will be aggravated.

The conditions (8) and (9) are effective for correcting astigmatism. Speaking concretely, it is difficult to correct astigmatism when radii of curvature $r_9$ and $r_{10}$ are smaller than $0.5f$ and $f$ respectively.

When $d_1 + d_2 + d_3 + d_4 + d_5 + d_6$ is smaller than the lower limit of $0.15f$ in the condition (10), it is impossible to design the lens system so as to have a small telephoto ratio and, in addition, various aberration will be aggravated. Aforementioned total sum exceeding $0.17f$ is undesirable since it makes Petzval's sum tend to have a negative valve.

When $d_5$, $d_6$ and $d_7$ exceed the upper limits in the conditions (11), (12) and (13) respectively, astigmatism, coma and high-order spherical aberration will be aggravated. If $d_5$, $d_6$ and $d_7$ are smaller than the lower limits in these conditions, on the other hand, it will be difficult to select a small telephoto ratio and various aberrations will be aggravated.

In the condition (14), it will be more advantageous to select $d_8$ smaller than $0.28f$ for designing the lens system so as to have a small telephoto ratio. However, such a thickness will remarkably aggravate distortion, chromatic aberration and coma for marginal upper rays.

The present invention adopts glass materials having relatively high refractive indices for the first, second and third lens components as defined by the condition (15) for favorably correcting spherical aberration, coma, etc. When the condition (15) is not satisfied, each of the aforementioned convex lens components will have so small a radious of curvature as to produce spherical aberration. If it is attempted to correct such spherical aberration by further bending said convex lens components, coma and astigmatism cannot be corrected favorably, thereby making it impossible to design a large aperture lens system.

Finally, the condition (16) is adopted for preventing Petzval's sum from being reduced and correcting coma by selecting appropriate radii of curvature for the fourth negative lens component. When $n_4$ is smaller than 1.76, Petzval's sum tends to have a positive value which degrades resolution in the sagital direction at marginal portion of image, and radius of curvature $r_8$ is small enough to aggravate offaxial aberration.

BRIEF DESCRIPTION OF THE DRAWINGS

FIG. 1 shows a sectional view illustrating the composition of the lens system according to the present invention;

FIG. 4A through FIG. 4C illustrate curves showing the aberration characteristics of Embodiment 3; and FIG. 5A through FIG. 5C show graphs illustrating the aberration characteristics of the Embodiment 4.

DETAILED DESCRIPTION OF PREFERRED EMBODIMENTS

Figure 2A:
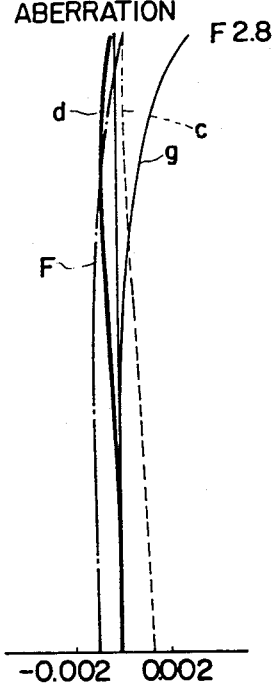
FIG. 2A through FIG. 2C show curves illustrating the aberration characteristics of the Embodiment 1.
Figure 2B:
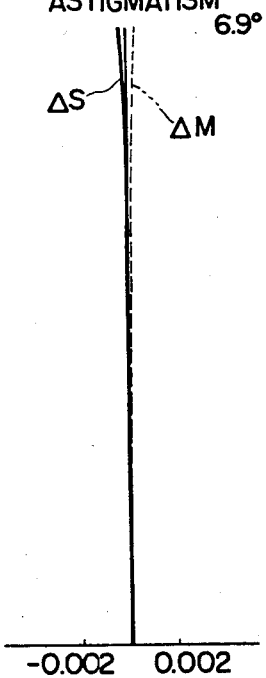
Figure 2C:
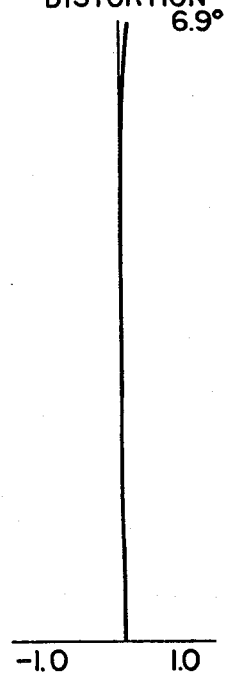
Figure 3A:
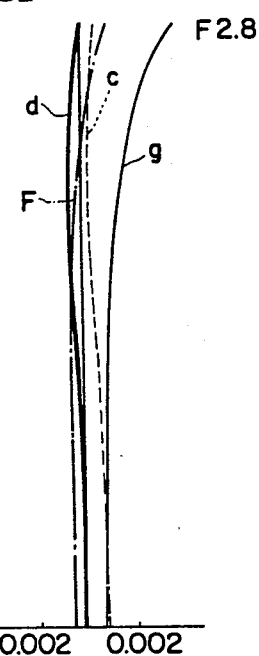
FIG. 3A through FIG. 3C show graphs illustrating the aberration characteristics of the Embodiment 2.
Figure 3B:
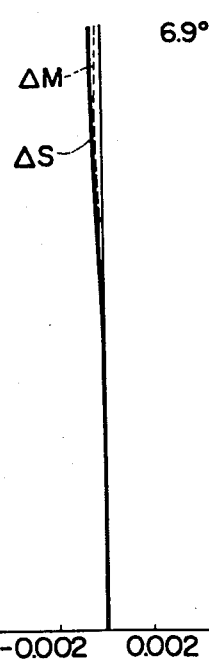
Figure 3C:
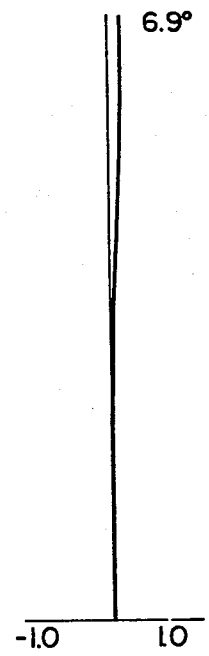

For better understanding of the present invention, some preferred embodiments will be illustrated below:

EMBODIMENT 1

$r_1 = 35.690; d_1 = 4.539; n_1 = 1.66672; \nu_1 = 48.32.$
$r_2 = 133.290; d_2 = 0.069.$
$r_3 = 34.416; d_3 = 3.191; n_2 = 1.62299; \nu_2 = 58.14.$
$r_4 = 52.578; d_4 = 0.056.$
$r_5 = 30.924; d_5 = 5.152\ n_3 = 1.60311; \nu_3 = 60.70.$
$r_6 = 38.925; d_6 = 2.500.$
$r_7 = 84.143; d_7 = 3.827; n_4 = 1.78472; \nu_4 = 25.71.$
$r_8 = 18.793; d_8 = 28.747.$
$r_9 = 52.057; d_9 = 3.039; n_5 = 1.76182; \nu_5 = 26.55.$
$r_{10} = 114.604; f = 100.0;\ F\ 2.8; f_B = 42.713; \Sigma d = 51.120.$

EMBODIMENT 2

$r_1 = 37.561; d_1 = 4.468; n_1 = 1.63854; \nu_1 = 55.38.$
$r_2 = 140.587; d_2 = 0.072.$
$r_3 = 35.586; d_3 = 2.545; n_2 = 1.63854; \nu_2 = 55.38.$
$r_4 = 56.993; d_4 = 0.200.$
$r_5 = 35.360; d_5 = 6.407; n_3 = 1.69350; \nu_3 = 50.81.$
$r_6 = 45.215; d_6 = 1.723.$
$r_7 = 91.228; d_7 = 4.974; n_4 = 1.76182; \nu_4 = 26.55.$
$r_8 = 19.143; d_8 = 28.869.$
$r_9 = 58.139; d_9 = 3.040; n_5 = 1.72825; \nu_5 = 28.46.$
$r_{10} = 144.164; f = 100.0;\ F\ 2.8; f_B = 41.535; \Sigma d = 52.298.$

EMBODIMENT 3

$r_1 = 35.296; d_1 = 4.542; n_1 = 1.63854; \nu_1 = 55.38.$
$r_2 = 154.848; d_2 = 0.100.$
$r_3 = 34.994; d_3 = 3.126; n_2 = 1.63854; \nu_2 = 55.38.$
$r_4 = 45.962; d_4 = 0.078.$
$r_5 = 31.878; d_5 = 5.625; n_3 = 1.69350; \nu_3 = 50.81.$
$r_6 = 43.434; d_6 = 2.460.$
$r_7 = 94.159; d_7 = 3.620; n_4 = 1.76182; \nu_4 = 26.55.$
$r_8 = 18.722; d_8 = 28.912.$
$r_9 = 52.671; d_9 = 2.876; n_5 = 1.72151; \nu_5 = 29.24.$
$r_{10} = 125.503; f = 100.0;\ F\ 2.8; f_B = 42.489; \Sigma d = 51.339.$

EMBODIMENT 4

$r_1 = 37.659; d_1 = 4.694; n_1 = 1.69680; \nu_1 = 55.52.$
$r_2 = 144.925; d_2 = 0.100.$
$r_3 = 35.033; d_3 = 3.149; n_2 = 1.65160; \nu_2 = 58.67.$
$r_4 = 50.969; d_4 = 0.008.$
$r_5 = 34.359; d_5 = 5.587; n_3 = 1.67790; \nu_3 = 50.72.$
$r_6 = 42.616; d_6 = 2.457.$
$r_7 = 92.529; d_7 = 3.617; n_4 = 1.76182; \nu_4 = 26.55.$
$r_8 = 19.497; d_8 = 28.885.$
$r_9 = 66.059; d_9 = 2.978; n_5 = 1.78472; \nu_5 = 25.71.$
$r_{10} = 179.348; f = 100.0;\ F\ 2.8; f_B = 42.427.\ \Sigma d = 51.475.$ wherein the reference symbols $r_1$ through $r_{10}$ represent radii of curvature on the surfaces of the respective lens components, the reference symbols $d_1$ through $d_9$ designate thicknesses of the respective lens components and airspaces therebetween, the reference symbols $n_1$ through $n_5$ denote refractive indices of the respective lens components, the reference symbols $\nu_1$ through $\nu_5$ represent Abbe's numbers of the respective lens components, reference symbol $f$ represents the focal length of the lens system as a whole and reference symbol $f_B$ designates the back focal length of the lens system.

I claim:

1. A variant Ernostar type long focus lens system comprising a first positive meniscus lens component, a second positive meniscus lens component, a third positive meniscus lens component, a fourth negative meniscus lens component and a fifth lens component, and said lens system satisfying the following conditions:

(1) $1.3 f < r_2$
(2) $0.3 f < r_3 < 0.36 f$
(3) $0.45 f < r_4 < 0.58 f$
(4) $0.3 f < r_5 < 0.36 f$
(5) $0.38 f < r_6 < 0.46 f$
(6) $0.8 f < r_7 < f$
(7) $0.18 f < r_8 < 0.2 f$
(8) $0.5 f < r_9$
(9) $f < r_{10}$
(10) $0.15 f < d_1 + d_2 + d_3 + d_4 + d_5 + d_6 < 0.17 f$
(11) $0.05 f < d_5 < 0.07 f$
(12) $0.01 f < d_6 < 0.03 f$
(13) $0.03 f < d_7 < 0.05 f$
(14) $0.28 f < d_8$
(15) $1.62 < (n_1 + n_2 + n_3)/3$
(16) $1.76 < n_4$ wherein the reference symbols $r_1$ through $r_{10}$ represent radii of curvature on the surfaces of the respective lens components, the reference symbols $d_1$ through $d_9$ designate the thicknesses of the respective lens components and airspaces therebetween, the reference symbols $n_1$ through $n_5$ denote the refractive indices of the respective lens components and reference symbol $f$ represents the focal length of the lens system as a whole, said system having the following numerical data:

$r_1 = 35.690; d_1 = 4.539; n_1 = 1.66672; \nu_1 = 48.32;$
$r_2 = 133.290\ d_2 = 0.069;$
$r_3 = 34.416; d_3 = 3.191; n_2 = 1.62299; \nu_2 = 58.14;$
$r_4 = 52.578; d_4 = 0.056;$
$r_5 = 30.924; d_5 = 5.152; n_3 = 1.60311; \nu_3 = 60.70;$
$r_6 = 38.925; d_6 = 2.500;$
$r_7 = 84.143; d_7 = 3.827; n_4 = 1.78472; \nu_4 = 25.71;$
$r_8 = 18.793; d_8 = 28.747;$ $r_9 = 52.057; d_9 = 3.039; n_5 = 1.76182; \nu_5 = 26.55;$
$r_{10} = 114.604; f = 100.0; F\ 2.8; f_B = 42.713; \Sigma d = 51.120;$ wherein the reference symbols $r_1$ through $r_{10}$ represent the radii of curvature on the surfaces of the respective lens components, the reference symbols $d_1$ through $d_9$ designate the thicknesses of the respective lens components and airspaces therebetween, the reference symbols $n_1$ through $n_5$ denote refractive indices of the respective lens components, the reference symbols $\nu_1$ through $\nu_5$ represent Abbe's numbers of the respective lens components, the reference symbol $f$ designates the focal length of the lens system as a whole and the reference symbol $f_B$ denotes the back focal length of the lens system as a whole.

2. A variant Ernostar type long focus lens system comprising a first positive meniscus lens component, a second positive meniscus lens component, a third positive meniscus lens component, a fourth negative meniscus lens component and a fifth lens component, and said lens system satisfying the following conditions:

(1) $1.3f < r_2$
(2) $0.3f < r_3 < 0.36f$
(3) $0.45f < r_4 < 0.58f$
(4) $0.3f < r_5 < 0.36f$
(5) $0.38f < r_6 < 0.46f$
(6) $0.8f < r_7 < f$
(7) $0.18f < r_8 < 0.2f$
(8) $0.5f < r_9$
(9) $f < r_{10}$
(10) $0.15f < d_1 + d_2 + d_3 + d_4 + d_5 + d_6 < 0.17f$
(11) $0.05f < d_5 < 0.07f$
(12) $0.01f < d_6 < 0.03f$
(13) $0.03f < d_7 < 0.05f$
(14) $0.28f < d_8$
(15) $1.62 < (n_1 + n_2 + n_3)/3$
(16) $1.76 < n_4$ wherein the reference symbols $r_1$ through $r_{10}$ represent radii of curvature on the surfaces of the respective lens components, the reference symbols $d_1$ through $d_9$ designate the thicknesses of the respective lens components and airspaces therebetween, the reference symbols $n_1$ through $n_5$ denote the refractive indices of the respective lens components and reference symbol $f$ represents the focal length of the lens system as a whole, said system having the following numerical data:
$r_1 = 37.561; d_1 = 4.468; n_1 = 1.63854; \nu_1 = 55.38;$
$r_2 = 140.587; d_2 = 0.072;$
$r_3 = 35.586; d_3 = 2.545; n_2 = 1.63854; \nu_2 = 55.38;$
$r_4 = 56.993; d_4 = 0.200;$
$r_5 = 35.360; d_5 = 6.407; n_3 = 1.69350; \nu_3 = 50.81;$
$r_6 = 45.215; d_6 = 1.723;$
$r_7 = 91.228; d_7 = 4.974; n_4 = 1.76182; \nu_4 = 26.55;$
$r_8 = 19.143; d_8 = 28.869;$
$r_9 = 58.139; d_9 = 3.040; n_5 = 1.72825; \nu_5 = 28.46;$
$r_{10} = 144.164; f = 100.0; F\ 2.8; f_B = 41.535; \Sigma d = 52.298;$ wherein the reference symbols $r_1$ through $r_{10}$ represent the radii of curvature on the surfaces of the respective lens components, the reference symbols $d_1$ through $d_9$ designate the thicknesses of the respective lens components and airspaces therebetween, the reference symbols $n_1$ through $n_5$ denote refractive indices of the respective lens components, the reference symbols $\nu_1$ through $\nu_5$ represent Abbe's numbers of the respective lens components, the reference symbol $f$ designates the focal length of the lens system as a whole and the reference symbol $f_B$ denotes the back focal length of the lens system as a whole.

3. A variant Ernostar type long focus lens system comprising a first positive meniscus lens component, a second positive meniscus lens component, a third positive meniscus lens component, a fourth negative meniscus lens component and a fifth lens component, and said lens system satisfying the following conditions:

(1) $1.3f < r_2$
(2) $0.3f < r_3 < 0.36f$
(3) $0.45f < r_4 < 0.58f$
(4) $0.3f < r_5 < 0.36f$
(5) $0.38f < r_6 < 0.46f$
(6) $0.8f < r_7 < f$
(7) $0.18f < r_8 < 0.2f$
(8) $0.5f < r_9$
(9) $f < r_{10}$
(10) $0.15f < d_1 + d_2 + d_3 + d_4 + d_5 + d_6 < 0.17f$
(11) $0.05f < d_5 < 0.07f$
(12) $0.01f < d_6 < 0.03f$
(13) $0.03f < d_7 < 0.05f$
(14) $0.28f < d_8$
(15) $1.62 < (n_1 + n_2 + n_3)/3$
(16) $1.76 < n_4$ wherein the reference symbols $r_1$ through $r_{10}$ represent radii of curvature on the surfaces of the respective lens components, the reference symbols $d_1$ through $d_9$ designate the thicknesses of the respective lens components and airspaces therebetween, the reference symbols $n_1$ through $n_5$ denote the refractive indices of the respective lens components and reference symbol $f$ represents the focal length of the lens system as a whole, said system having the following numerical data:
$r_1 = 35.296; d_1 = 4.542; n_1 = 1.63854; \nu_1 = 55.38;$
$r_2 = 154.848; d_2 = 0.100;$
$r_3 = 34.994; d_3 = 3.126; n_2 = 1.63854; \nu_2 = 55.38;$
$r_4 = 45.962; d_4 = 0.078;$
$r_5 = 31.878; d_5 = 5.625; n_3 = 1.69350; \nu_2 = 50.81;$
$r_6 = 43.434; d_6 = 2.460;$
$r_7 = 94.159; d_7 = 3.620; n_4 = 1.76182; \nu_4 = 26.55;$
$r_8 = 18.722; d_8 = 28.912;$
$r_9 = 52.671; d_9 = 2.876; n_5 = 1.72151; \nu_5 = 29.24;$
$r_{10} = 125.503; f = 100.0; F\ 2.8; f_B = 42.489; \Sigma d = 51.339;$ wherein the reference symbols $r_1$ through $r_{10}$ represent the radii of curvature on the surfaces of the respective lens components, the reference symbols $d_1$ through $d_9$ designate the thicknesses of the respective lens components and airspaces therebetween, the reference symbols $n_1$ through $n_5$ denote refractive indices of the respective lens components, the reference symbols $\nu_1$ through $\nu_5$ represent Abbe's numbers of the respective lens components, the reference symbol $f$ designates the focal length of the lens system as a whole and the reference symbol $f_B$ denotes the back focal length of the lens system as a whole.

4. A variant Ernostar type long focus lens system comprising a first positive meniscus lens component, a second positive meniscus lens component, a third positive meniscus lens component, a fourth negative meniscus lens component and a fifth lens component, and said lens system satisfying the following conditions:

(1) $1.3f < r_2$
(2) $0.3f < r_3 < 0.36f$
(3) $0.45f < r_4 < 0.58f$ (4) $0.3f < r_5 < 0.36f$
(5) $0.38f < r_6 < 0.46f$
(6) $0.8f < r_7 < f$
(7) $0.18f < r_8 < 0.2f$
(8) $0.5f < r_9$
(9) $f < r_{10}$
(10) $0.15f < d_1 + d_2 + d_3 + d_4 + d_5 + d_6 < 0.17f$
(11) $0.05f < d_5 < 0.07f$
(12) $0.01f < d_6 < 0.03f$
(13) $0.03f < d_7 < 0.05f$
(14) $0.28f < d_8$
(15) $1.62 < (n_1 + n_2 + n_3)/3$
(16) $1.76 < n_4$ wherein the reference symbols $r_1$ through $r_{10}$ represent radii of curvature on the surfaces of the respective lens components, the reference symbols $d_1$ through $d_9$ designate the thicknesses of the respective lens components and airspaces therebetween, the reference symbols $n_1$ through $n_5$ denote the refractive indices of the respective lens components and reference symbol $f$ represents the focal length of the lens system as a whole, said system having the following numerical data:

$r_1 = 37.659$; $d_1 = 4.694$; $n_1 = 1.69680$; $\nu_1 = 55.52$;
$r_2 = 144.925$; $d_2 = 0.100$;
$r_3 = 35.033$; $d_3 = 3.149$; $n_2 = 1.65160$; $\nu_2 = 58.67$;
$r_4 = 50.969$; $d_4 = 0.008$;
$r_5 = 34.359$; $d_5 = 5.587$; $n_3 = 1.67790$; $\nu_3 = 50.72$;
$r_6 = 42.616$; $d_6 = 2.457$;
$r_7 = 92.529$; $d_7 = 3.617$; $n_4 = 1.76182$; $\nu_4 = 26.55$;
$r_8 = 19.497$; $d_8 = 28.885$;
$r_9 = 66.059$; $d_9 = 2.978$; $n_5 = 1.78472$; $\nu_5 = 25.71$;
$r_{10} = 179.348$; $f = 100.0$; F 2.8; $f_B = 42.427$; $\Sigma d = 51.475$;

wherein the reference symbols $r_1$ through $r_{10}$ represent the radii of curvature on the surfaces of the respective lens components, the reference symbols $d_1$ through $d_5$ designate the thicknesses of the respective lens components and airspaces therebetween, the reference symbols $n_1$ through $n_5$ denote refractive indices of the respective lens components, the reference symbols $\nu_1$ through $\nu_5$ represent Abbe's numbers of the respective lens components, the reference symbol $f$ designates the focal length of the lens system as a whole and the reference symbol $f_B$ denotes the back focal length of the lens system as a whole.

* * * * *